J. SCHREIBER.
CARBURETER.
APPLICATION FILED JULY 11, 1912.

1,078,169.

Patented Nov. 11, 1913.

3 SHEETS—SHEET 1.

WITNESSES:
Harry A. Bennes
Fannie E. Weber

INVENTOR.
John Schreiber
BY Emil Stareu
ATTORNEY.

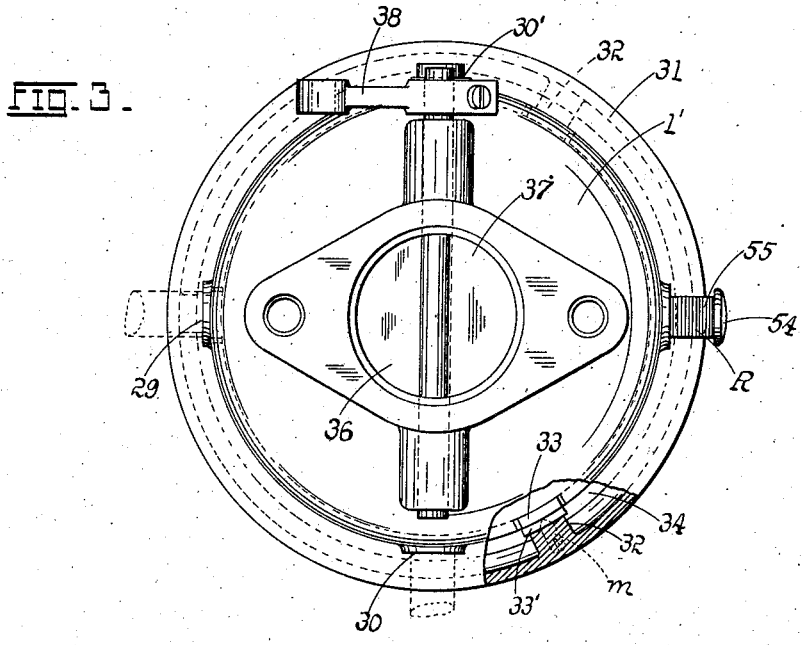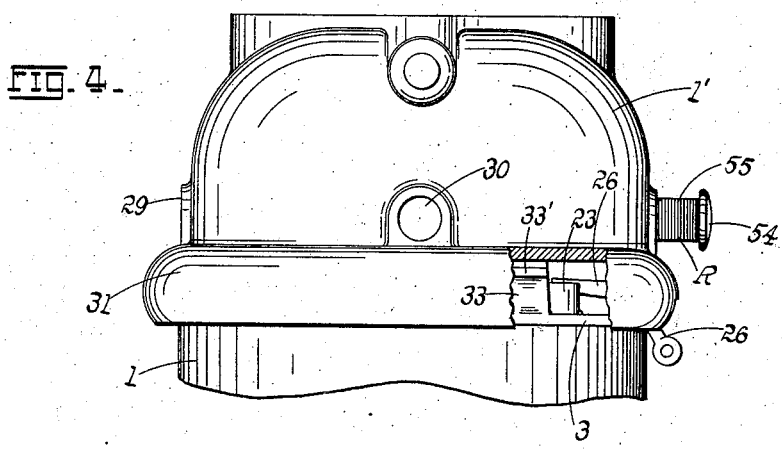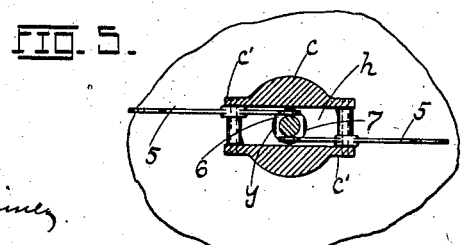

J. SCHREIBER.
CARBURETER.
APPLICATION FILED JULY 11, 1912.
1,078,169.
Patented Nov. 11, 1913.
3 SHEETS—SHEET 3.
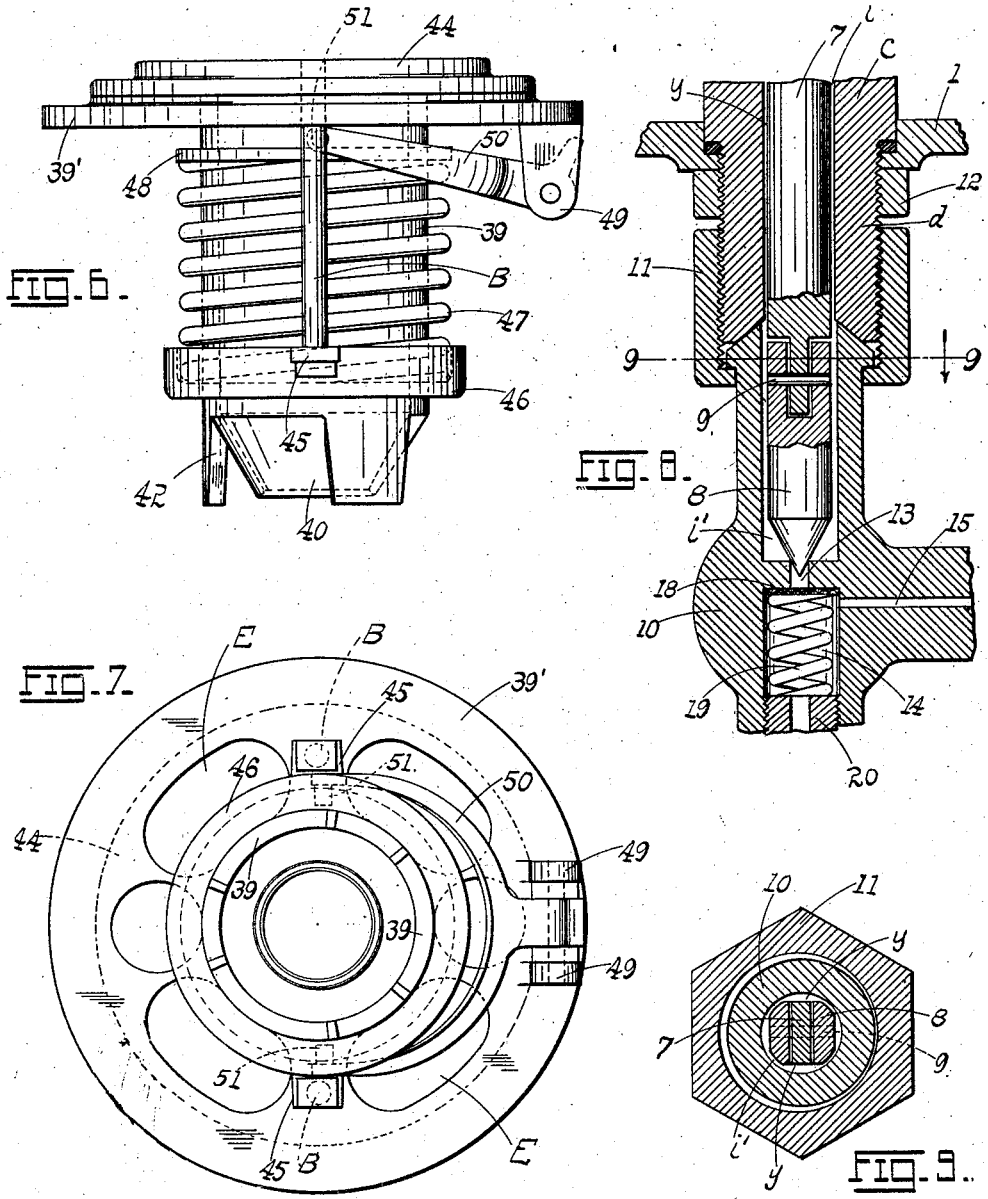
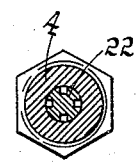
WITNESSES:
Harry A. Bennes.
Fannie E. Weber.
INVENTOR.
John Schreiber
BY Ernst Starer
ATTORNEY.

UNITED STATES PATENT OFFICE.

JOHN SCHREIBER, OF ST. LOUIS, MISSOURI.

CARBURETER.

1,078,169.  Specification of Letters Patent.  Patented Nov. 11, 1913.

Application filed July 11, 1912. Serial No. 708,904.

*To all whom it may concern:*

Be it known that I, JOHN SCHREIBER, a subject of the Emperor of Germany, residing at St. Louis, State of Missouri, have invented certain new and useful Improvements in Carbureters, of which the following is a full, clear, and exact description, reference being had to the accompanying drawings, forming a part hereof.

My invention has relation to improvements in carbureters; and it consists in the novel details of construction more fully set forth in the specification and pointed out in the claims.

Figure 1:
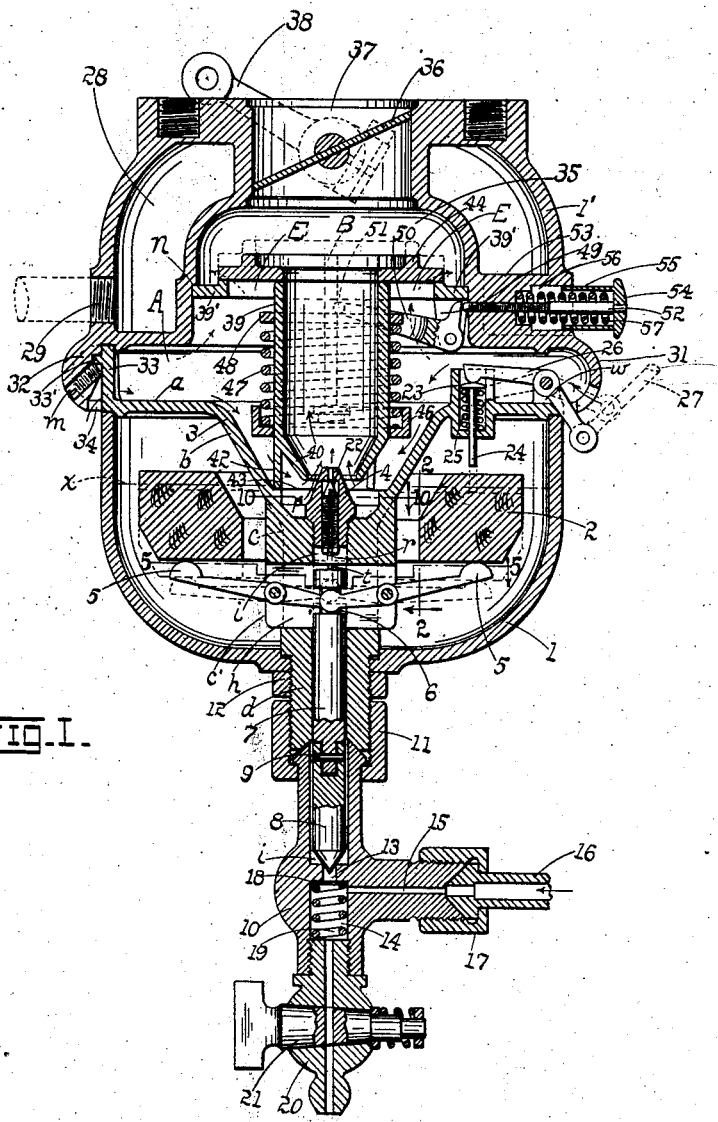
Figure 2:
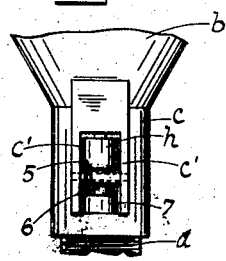

In the drawings, Figure 1 is a middle vertical section of the carbureter; Fig. 2 is a vertical sectional detail on the line 2—2 of Fig. 1, with the float omitted; Fig. 3 is a top plan with parts broken away; Fig. 4 is an elevation of the upper portion of the carbureter, with parts broken away; Fig. 5 is a horizontal sectional detail on the line 5—5 of Fig. 1; Fig. 6 is a detached enlarged side elevation of the valve-support and seat, and air-valve, and controlling devices for the valve; Fig. 7 is a bottom plan of Fig. 6; Fig. 8 is an enlarged middle vertical section of the feed-valve casing and the stem of the hood for the float-chamber; Fig. 9 is a cross-section on the line 9—9 of Fig. 8; and Fig. 10 is a cross-section through the needle-valve on the line 10—10 of Fig. 1.

The present invention relates to a type of carbureter specially applicable in connection with motors for automobiles or self-propelled vehicles, and has for its objects (1) to provide means for automatically controlling the air supply which serves as a complement to the spray of gasolene issuing from the gas nozzle or aspirator with a view of maintaining a perfect mixture under general service conditions; (2) to provide means under the control of the chauffeur or operator for admitting a sudden influx of gasolene into the float chamber for purposes of a rich starting mixture; (3) to provide means for feeding the air in paths converging from the periphery of the carbureter toward and across a centrally or axially disposed gas nozzle, thereby effecting an intimate initial mixture between the air and gasolene; (4) to provide means for feeding to this initial mixture supplemental charges of air to furnish the proper complement of oxygen for the perfect mixture necessary in general service, such supplemental charges being likewise directed along radial lines converging from the periphery of the carbureter toward the axis of the mixing chamber; (5) to provide means for automatically controlling the auxiliary air-valve according to the degree of vacuum in the chamber, and means for regulating said valve with a view of maintaining a perfect mixture for a given type of motor or engine; (6) to provide means for adjusting the valve which controls the jet from the aspirator; (7) to provide means for keeping warm the walls of the carbureter; (8) to construct a carbureter in which all the parts are disposed symmetrically about a common central axis; and (9) to provide further and other features of construction the advantages of which will become apparent from a detailed description of the invention which is as follows:

Referring to the drawings, 1 represents the float chamber in which is located an annular cork or equivalent float 2 well understood in the art, the float herein being shown as of cork. The float chamber is provided with a cover or hood 3 shouldered to the upper edge of the chamber, said cover having an upper outer flat or disk-shaped portion or section $a$, and a central inverted conical (or truncated conical) portion or section $b$, an intermediate cylindrical portion $c$, and a bottom stem $d$, all symmetrically disposed about the axis of the float chamber and carbureter. The portions $c$, $d$, are provided with an axial passage-way $i$ at the top of which is secured the stem of a conical spray nozzle or aspirator 4, shouldered to the portion $c$ and projecting into the section $b$. The stem $d$ is shouldered to the bottom of the chamber 1 and projects a suitable distance beyond and below the same. The passage $i$ is intersected by a transverse chamber $h$ formed in the section $c$, there being pivoted between the side extensions or walls $c'$ of said chamber on opposite sides of the axis of the passage-way $i$ the levers 5, 5, the ends of whose long arms bear against the bottom of the float 2, the ends of the short arms operating in, and on opposite sides of an annular groove 6 formed near the upper end of a stem 7 coupled to the intake valve 8 and loosely operating (between the levers) in said passage-way $i$. The parts 7, 8, are connected together by a tongue and groove connection, a pin 9 being driven through the parts so as to leave the valve 8 hanging freely from the stem 7. The valve 8 operates loosely in a passage $i'$ (which is in alinement with the passage $i$) formed in the valve casing 10, said casing being connected to the stem $d$ by means of a nut or union 11, a clamp nut 12 being interposed between it and the bottom of the float chamber. At the same time the hood 3 is drawn tightly to the walls of the float-chamber as obvious from the drawings. The valve 8 controls an intake port 13 connecting the passage $i'$ with a chamber 14 to which the gasolene is first conducted through the passage-way 15 formed in the casing 10, the passage 15 receiving the hydrocarbon from the gasolene connection 16 which is secured to the casing by a union nut 17. Across the port 13 is held a strainer 18, a spring 19 within the chamber 14 bearing with one end against the strainer and holding the same in position, the opposite end of the spring resting on a screw-plug 20 serving as a drain-cock, the same being provided with a valve 21 well understood in the art. The jet through the nozzle 4 is controlled by a peripherally longitudinally-grooved screw-needle-valve 22 whose lower end is provided with a groove or recess $r$ to receive the tongue $t$ formed at the upper end of the stem 7, said stem and tongue operating as a screw-driver for the valve. By uncoupling the valve-casing 10, so as to expose the valve 8, the latter may be seized and raised until the tongue $t$ engages the recess $r$, after which by giving the members 7, 8, a turn (they rotating as a unit by virtue of the tongue and groove connection between them) in proper direction, the valve 22 may be accurately adjusted to deliver a spray to suit the motor. The form of valve here shown is well understood in the art. The levers 5, 5, in no wise interfere with the rotation of the stem 7, the ends of their short lever-arms playing freely in the groove 6. The needle valve being set, the casing 10 is attached and the carbureter is ready for service. The float resting on the levers 5, 5, causes them to lift the stem 7 and its valve 8 sufficiently to open the port 13 to allow for the necessary feed of the gasolene (through the clearance passages $v$, Fig. 9) into the float-chamber under ordinary service conditions, the level of the gasolene being maintained at substantially the line $x$ (Fig. 1); but for starting purposes where a rich mixture is desired preparatory to cranking, it is desirable to admit an increased volume of gasolene into the float chamber or to flood or flush the same, and this may be accomplished by mechanism under the control of the chauffeur whereby a maximum depression may be imparted to the float, thus lifting the feed-valve 8 its full limit and opening wide the port 13. This flush-mechanism is as follows:—Formed on the section $a$ of the hood 3 above the float 2 is a socket 23 through the bottom of which operates a flushing pin 24, a coiled compression spring 25 interposed between the bottom of the socket and the head of the pin serving to hold the latter retracted from the float. The head of the pin is engaged by the end of one arm of a bell-crank lever 26 pivoted between lugs $w$ near the edge of the hood, the outer arm of the bell-crank being coupled to a rod 27 leading to within easy reach of the chauffeur whereby the bell-crank may be oscillated in proper direction to depress the pin 24 sufficiently to engage and depress the float, and thus suddenly flush the float-chamber for the purpose specified. Obviously a depression of the float will depress the outer ends of the levers 5, 5, causing the inner ends thereof to lift the members 7, 8, and allow the gasolene to rush into the open chamber $h$ and hence into the float chamber 1.

The float chamber with its hood or cover may be considered as the lower section of the carbureter, the upper section being coupled directly thereto. The upper section 1' is formed with an outer water-jacket 28 having hot water-inlet and discharge openings 29, 30, 30', respectively, any manner of pipe connections being improvised to introduce and conduct away the water, and not necessary to enlarge upon here since falling within the purview of the skilled mechanic. One of the openings may be closed by a plug while the other two remain in service. The base of the upper carbureter section terminates in an annular flange 31 substantially semi-circular in cross-section, there being formed integrally therewith and distributed along the inner face of the flange, a series of bosses 32 corresponding in number (three) to the series of lugs 33 disposed about the upper edge of the hood 3. Formed integrally with the lugs 33 are outer ledges 33' with the bottoms of which the upper faces of the bosses are adapted to engage. By superposing the flange 31 over the hood 3 and lowering the section 1' so as to cause the bosses to come to one side of their respective lugs, and then giving the section 1' a sufficient rotation to bring the bosses under the ledges 33', the parts are readily secured by running screws $m$ diagonally through the bosses to the ledges 33'. When the sections are thus united there is left a circumferential peripheral clearance between the sections, resulting in corresponding air-intake openings or slots 34 the continuity of which is interrupted only by the lugs 33, so that practically there is left a circumferential peripheral slot for the free passage of air toward the jet discharging from the nozzle 4, the air flowing toward (and past) the nozzle in converging streams. It may be stated in passing that the flange 31 is suitably cut away to allow for the necessary play of the bell-crank or flood lever 26 above referred to.

The water-jacket surrounds the upper portion of the mixing chamber 35 of the carbureter, the outlet from said chamber being controlled by the rotary throttle-valve 36 which establishes communication between it and the vacuum chamber 37 beyond the throttle, said throttle being coupled to the lever 38 under control of the chauffeur as understood in the art.

Forming the lower portion of the mixing chamber is a cylinder or tubular shell 39 whose upper end is provided with an annular flange 39′ serving as a valve-seat, said seat being provided with air passages or openings E. The lower end of the cylinder terminates in an inverted conical intake mouth 40 encompassing the spray-nozzle 4 and extending a suitable distance below the point of discharge from said nozzle, the cylindrical walls of the shell around the mouth 40 being extended in the form of feet or lugs 42 adapted to rest on an annular ledge 43 at the base of the section b of the hood 3, the seat 39′ bearing against an annular shoulder n on the inner water-jacket wall, the member 39, 39′ being thus held rigidly in position within the upper section of the carbureter. Seated on the valve-seat 39′ and covering the openings or air-passages E thereof is an auxiliary annular air-valve 44 which in its seated or depressed position cuts off the flow of air through the openings into the upper portion of the mixing chamber; the only communication between the air intake slots 34 and the mixing chamber being through the annular passageway p between the nozzle 4 and mouth 40 of the shell 39, the chamber of which in effect forms the lower portion of the mixing chamber (see plain arrows in Fig. 1). Unless service conditions require a lifting of the air-valve, the latter remains seated or closed, the holding thereof to its seat being effected and the intensity with which it is so held being determined, by the following mechanism: Secured to the air-valve 44 and passing loosely through the seat 39′ are bolts B, the lower ends of which are coupled to the diametrically oppositely disposed lugs 45 of a channel ring or seat 46 in which rests the lower end of the compression spring 47 coiled about the shell 39, the upper end of the spring bearing against an annular washer or ring 48, said ring and the seat 46 being loose about the shell 39. It may be stated in passing that the air-valve is guided in its movements or reciprocations by the bolts B which operate freely through the seat 39′ the spring 47 contracting with an opening or unseating of the valve, and expanding with the seating thereof, the ring 48 being disposed between the bolts as shown. Pivotally secured between a pair of lugs or ears 49, 49, is a forked bell-crank lever 50, the forked terminals being provided with studs 51 which engage the upper face of the ring 48, the fork arms terminating opposite the bolts B. Engaging the free end of the outer short arm of the bell-crank lever 50 is a screw-stem 52 mounted in a boss or rib 53 disposed across the water-jacket 28, the head 54 of the screw having secured thereto or formed therewith a cylindrical apron or shield 55 operating in a socket 56 formed on the boss 53, a lock compression-spring 57 being housed within the socket and shield, and coiled about the stem 52 and bearing against the head 54. This spring (57) serves to lock the screw-stem against rotation once it has been turned, and driven the proper distance inward to cause the lever 50 to impress on the spring 47 the proper tension by which the air valve is held to its seat. It is obvious of course that by driving the screw 52 against the outer arm of the bell-crank 50, the forked arms thereof will be depressed, causing the studs 51, to depress the ring 48 and thus compress the spring 47. The degree of compression imposed on the spring 47 determines the tenacity with which the air valve is held to its seat, and hence the degree of vacuum necessary to unseat the same. The screw-stem 52 thus regulates the tension of the spring 47 and therefore the pressure by which the air-valve is held to its seat. The degree of that pressure may be indicated by a register or graduated scale R consisting of a series of marks on the periphery of the apron 55.

From the foregoing the operation of the carbureter will now be understood. The manner of normal flow of the gasolene into the float-chamber from the connection 16 through the passages v around the members 7, 8, and the manner of flushing the carbureter for cranking purposes by a proper manipulation of the bell-crank flood-lever 26 has already been explained and requires no repetition here. Assuming that the engine has been cranked and the automobile started, it will be apparent that as the speed of the motor is increased, the greater will be the draft exerted by the vacuum in the chamber beyond the throttle, an increase resulting from an increased opening of the throttle. The suction obviously will draw on the aspirator and on the air complement fed to the aspirator jet, and as the vacuum increases it will eventually lift the air valve against the tension of the spring 47, the lifting of the valve allowing air to rush through the openings E of the valve-seat 39′ into the upper portion of the mixing chamber. This auxiliary air complement flows into the space or air chamber A formed around the shell 39 through the circumferential openings 34, thence through the openings E (see dotted arrows Fig. 1), mingling with the mixture of gas and air from the aspirator discharging through the top of the shell, and through the opening of the annular air-valve resting on the flange 39' thereof, the conjoint mixture passing from the upper portion of the mixing chamber into the vacuum chamber beyond the throttle. The auxiliary air complement permitted to mingle with the mixture leaving the aspirator is determined by the distance to which, and the length of time during which, the air valve is unseated, these factors being determined by the tension imparted to the spring 47 and which is regulated by the screw 52, such tension being in turn determined by the horse-power and character of the engine of any particular machine. The regulation of this tension is facilitated by the register R marked on the apron 55 which shows at a glance the distance to which the screw-stem 52 has been driven.

It will be seen that the conical intake 40 to the shell 39 or lower portion of the mixing chamber guides the converging air currents toward the mouth of the aspirator or nozzle 4, the said currents flowing across the said mouth, impinging against the inner walls of the shell which they enter as a flaring sheet which is more or less impaled by the gasolene jet, the combined gasolene spray and air mixing thoroughly in the chamber of the shell (which chamber as stated is in effect the lower extension of the mixing chamber) and when these encounter the converging auxiliary air currents admitted into the mixing chamber by the unseating of the air-valve, the two currents become thoroughly mixed before they pass on (as a perfect mixture) past the throttle into the vacuum chamber. At such intervals as the air valve may not be under the strain of the suction of the vacuum chamber, the same automatically seats under the action of the spring 47 bearing against the ring 48 engaged by the pressure-adjusting lever 50.

An important virtue in the present carbureter lies in the fact that all parts are symmetrically disposed about a common vertical axis, making the device self contained, the liquid intake, the gas discharge, the aspirator outlet and air-valve being all disposed about the axis of the carbureter. Such an arrangement leads to compactness of structure and is conducive to high efficiency.

The cross-section of the carbureter though here shown as circular may obviously be polygonal; and the term "circumferential" as employed herein is to be understood as extending to polygonal cross-sections as well as to circular ones. The member 39 with its flange 39' may be designated as an auxiliary air-valve support, the immediate support for the valve being of course the flange or seat 39'. This support being a hollow or tubular member serves the additional function of a mixing chamber, performing thereby two functions at the same time. The air-valve and seat therefor though here shown as annular, may be polygonal without departing from the scope of my invention, and the term "annular" in the claims is to be construed as covering polygonal formations as well as annular.

Obviously, the carbureter need not be restricted in its application to automobiles, but may be used with any suitable motor whatsoever.

Having described my invention, what I claim is:—

1. In a carbureter, a float-chamber, a nozzle leading therefrom, a screw-valve for the nozzle, a float-controlled reciprocating rotatable valve-stem, and means on the nozzle-valve and valve-stem for turning the nozzle-valve upon rotation of the valve-stem.

2. In a carbureter, a float-chamber, a central nozzle leading therefrom, a member secured to the float-chamber and spaced therefrom, and forming a circumferential air intake therewith, a flanged tubular air-valve support in said member enveloping the nozzle and spaced from the latter, an air-valve on said flange, a spring seat enveloping the support, a compression spring encompassing the support and resting on the seat, a washer ring loosely enveloping the support and resting on the spring, suitable connections between the spring seat and valve, operating loosely through the flange of the valve support, a forked bell-crank lever pivoted to the flange and bearing with one end against the washer ring, a screw stem mounted on the carbureter wall and engaging the opposite end of the bell-crank lever, whereby the tension of the spring may be adjusted, a mixing chamber above the valve-seat or flange communicating with the chamber of the valve-support, and a throttle valve at the outlet from the mixing chamber, the parts operating substantially as and for the purpose set forth.

3. In a carbureter, a float chamber, a hollow air valve above the same, a nozzle leading from the float chamber and discharging through the air valve, a tension spring coupled to the air-valve, a bell-crank lever for controlling the spring, a screw-stem for actuating the lever, a head on the stem, a hollow shield carried by the stem, a socket, a locking spring in the socket engaging the head of the stem, the walls of the shield being graduated for the purpose set forth.

4. In a carbureter, a mixing chamber, a tubular valve support having an upper annular flange serving as a valve seat, an air valve resting on said seat, a float chamber, a nozzle leading from the float-chamber and discharging into the chamber of the valve-support, a ledge around the nozzle for supporting the base of the valve support, a suitable conical formation on the support for directing the currents from the nozzle into the chamber of the support, bolts secured to the valve and passing loosely through the annular seat, a channel ring surrounding the support and secured to the bolts, a washer ring loosely encompassing the support, a compression spring coiled about the support and engaging the channel ring and washer ring, and means under the control of the operator for shifting the position of the washer ring whereby the tension of the spring controlling the air-valve may be adjusted.

In testimony whereof I affix my signature, in presence of two witnesses.

JOHN SCHREIBER.

Witnesses:
 EMIL STAREK,
 FANNIE E. WEBER.